Figure 1:
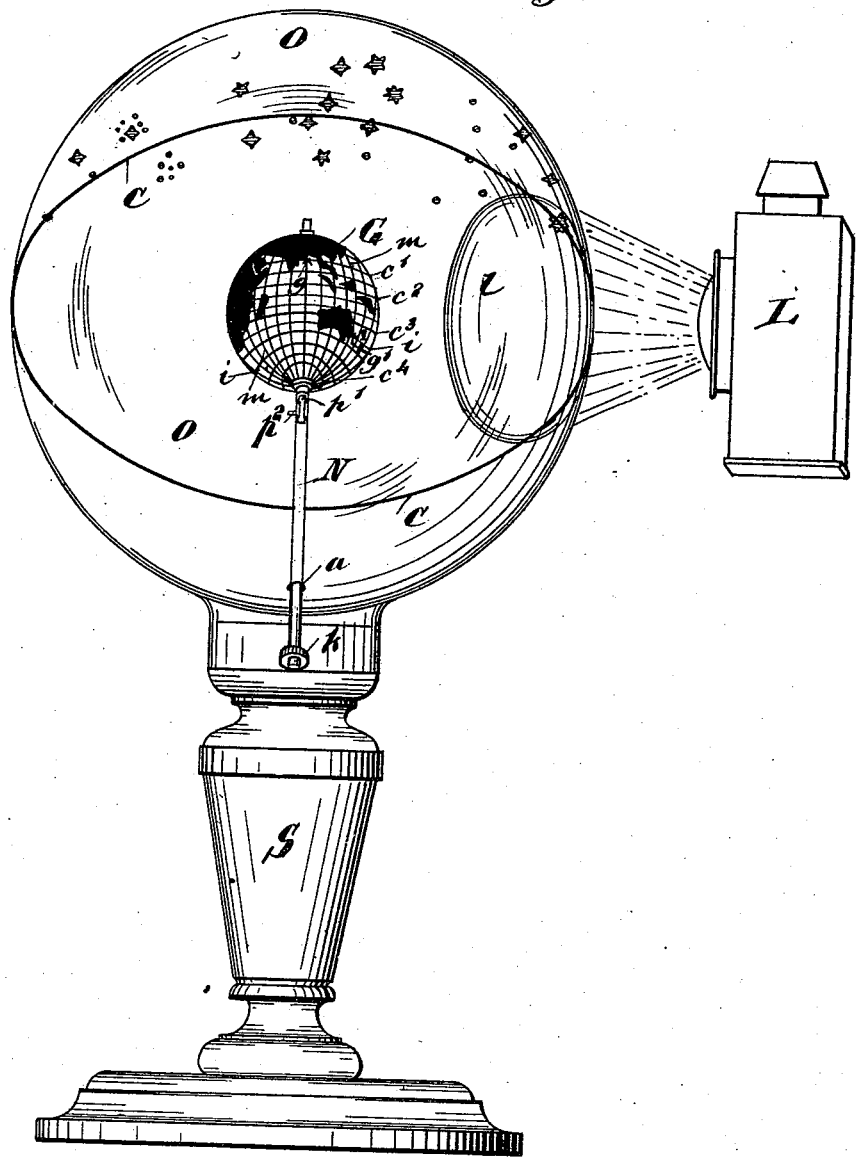

(No Model.) 2 Sheets—Sheet 1.

A. M. GREGORY.
APPARATUS FOR TEACHING ASTRONOMY AND GEOGRAPHY.

No. 501,136. Patented July 11, 1893.

Witnesses
James Miller
Albert Edward Ellen

Inventor
Annie Margaret Gregory
by George Henry Rayner
her Attorney.

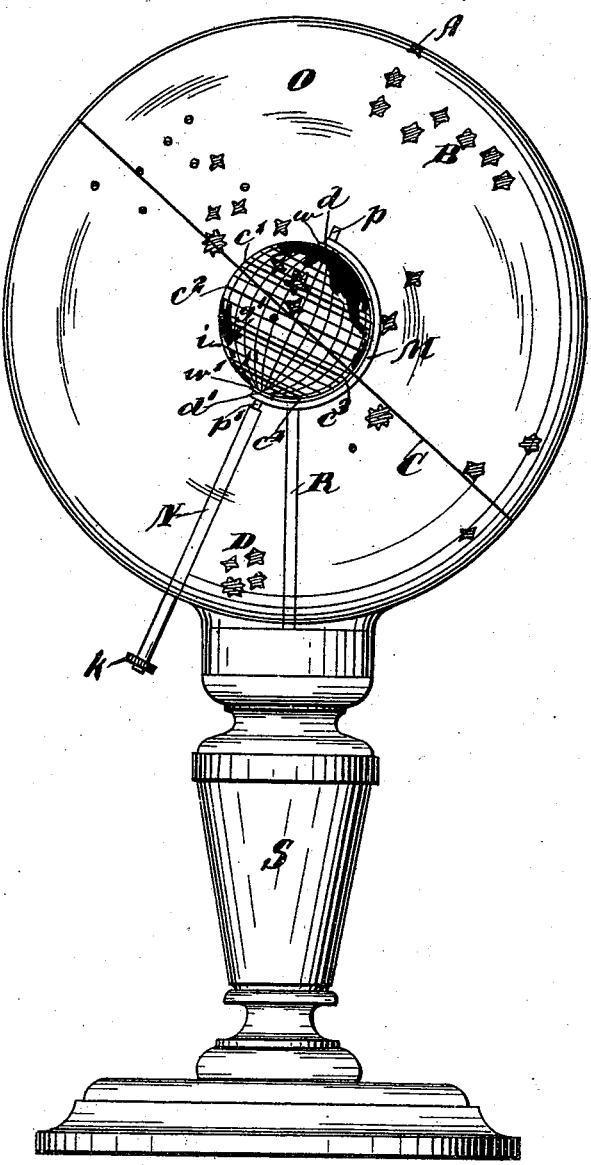

UNITED STATES PATENT OFFICE.

ANNIE MARGARET GREGORY, OF LONDON, ENGLAND.

APPARATUS FOR TEACHING ASTRONOMY AND GEOGRAPHY.

SPECIFICATION forming part of Letters Patent No. 501,136, dated July 11, 1893.

Application filed January 28, 1893. Serial No. 460,485. (No model.) Patented in England October 25, 1892, No. 17,107.

*To all whom it may concern:*

Be it known that I, ANNIE MARGARET GREGORY, a subject of the Queen of Great Britain and Ireland, residing at 38 Ashley Road, Crouch Hill, London, in the county of Middlesex, England, have invented certain new and useful Improvements in Apparatus for Teaching Astronomy and Geography, (for which I have obtained a patent in Great Britain, No. 17,107, dated October 25, 1892,) of which the following is a specification.

My invention relates to improvements in apparatus for the tuition of astronomy and geography, either separately or in connection one with the other, the object in view being to facilitate the understanding of these abstruse subjects by so ocularly demonstrating and illustrating the relative position of the celestial with the terrestrial globe under the various conditions to which the motion of the earth may give rise, as to rapidly and fully familiarize the pupil with the many symbols, definitions, names and lines used in connection with such motion or with the description of the peculiar features of the terrestrial and celestial worlds. The device I employ to carry out this object is shown in the accompanying drawings, in which—

Figure 1 is a front elevation of my improved apparatus accompanied by a bull's eye lantern, and Fig. 2 is a front elevation at right angles to Fig. 1.

S is the stand of wood or other suitable material, which carries a central rod R at the top. This rod is screwed into the brass meridian M, in the ends of which are journaled the pins $p$, $p'$, fixed in the globe G at the opposite ends of the diameter $d$, $d'$. Another rod N can be fixed by a bayonet joint to the pin $p'$, provided for this purpose with a cross pin $p^2$, and serves to turn the globe or earth G upon its polar ends or pins $p$ $p'$. It is furnished with a knob $k$, to facilitate its manipulation, and extends as shown in Fig. 2, through the lower part of the glass globe O, perforated at $a$ to allow for its passage through the same.

The glass globe O represents the celestial sphere and is furnished with a great circle C representing the ecliptic or the sun's apparent annual path, with various stars belonging to the constellations of the zodiac, with the polar star A, the plow B and the southern cross D. The glass globe O should be placed in such a manner upon the stand S that the upward prolongation of the diameter $d$, $d'$ should pass through the center of the polar star A, the southern cross being at the lower part of the globe O. Its orientation is thus assured. The globe or earth G is furnished with five successive circles $c$, $c'$, $c^2$, $c^3$, $c^4$, representing respectively from north to south the parallel of sixty-six and one-half degrees, the Tropic of Cancer, the equator, the Tropic of Capricorn, and the parallel of sixty-six and one-half degrees. It is further provided with a number of parallels $i$ and a number of meridians of longitude $m$.

The two crosses $g$ $g'$ indicate the position of an observer at two important points on the surface of the earth.

L is the bull's eye lamp, the circular light $l$ of which is cast upon the globe O, and is assumed to represent the sun. By moving this light along the ecliptic, the sun is made to pursue its apparent annual path, and the pupil obtains a view of the sun from the earth by day. The position of the sun at the equinoxes in Libra or Aries causes the line dividing daylight from darkness to cut through both poles, while by moving the sun to the solstices in Cancer or Capricorn, it will throw a bright illuminating circle on the pole nearest to it and a corresponding circle of shadow around the opposite pole. The varying meridian altitudes of the sun on various parts of the surface of the earth can thus be demonstrated, and the pupil by placing himself at any point can see the sun sink or rise in the ecliptic.

Among the further illustrations obtained by means of my improved apparatus may be cited details of the relation of the terrestrial to the celestial sphere, the distinction between the enveloping atmosphere of the earth and the regions of space.

The apparatus above described may be used to illustrate almost every fact relating to astronomy and geography in so far as the relative position of the celestial with the terrestrial globe, and the separate features of each globe are concerned. I will give two practical illustrations by way of example, indicating how the apparatus may be employed.

First. By removing the brass knob K and slowly rotating the glass globe O upon the stand S, each sign of the zodiac is made visible in succession from the same point on the earth's equator. This is done to show that in reality the earth in its annual path sweeps through these signs.

Second. The pupil takes an imaginary voyage proceeding southward from some point on the northern half of the terrestrial globe G. He sees the polar star A and the plow B continually dip lower in the horizon until below the center of C, when they are lost to view, while the southern cross D rises higher and higher overhead, disappearing subsequently as the polar star A reappears in its homeward voyage. This illusion is evidently due to the roundness of the earth and thus enables the pupil to find an additional proof of the earth's rotundity from north to south, which has never been proved by circumnavigation. The glass globe O is removable from the stand and thus leaves the terrestrial sphere free for any demonstrations that are required to be made, and as it easily rotates either way it is capable of more easy manipulation than ordinary globes. The glass globe O also rotates easily upon the top of the stand S, which is rabbeted to receive the same.

What I claim as my invention, and desire to secure by Letters Patent, is—

An apparatus for teaching astronomy and geography, consisting of a stand, a hollow glass globe freely supported thereon and provided with representations of stars and a circle representing the ecliptic, a rod fixed to the stand extending within said globe, a semicircular support attached to said rod, a globe representing the earth mounted on said support centrally of the glass globe and provided with meridians and parallels and a detachable rod attached to the axis of said earth globe and passing through said glass globe substantially as described.

In witness whereof I have hereunto set my hand at London, this 2d day of January, 1892, in the presence of two witnesses.

ANNIE MARGARET GREGORY.

In presence of—
JAMES MILLER,
ALBERT EDWARD ELLEW.